United States Patent
Blondel et al.

(10) Patent No.: US 9,963,532 B2
(45) Date of Patent: May 8, 2018

(54) LOW-CONCENTRATION, INVERSE EMULSION OBTAINED BY POLYMERIZATION OF WEAKLY NEUTRALIZED POLYMERS

(71) Applicant: S.P.C.M. SA, Andrezieux-Boutheon (FR)

(72) Inventors: Frederic Blondel, Lezigneux (FR); Lionel Champagnon, Magneux Haute Rive (FR)

(73) Assignee: S.P.C.M. SA, Andrezieux Boutheon (FR)

( * ) Notice: Subject to any disclaimer, the term of this patent is extended or adjusted under 35 U.S.C. 154(b) by 198 days.

(21) Appl. No.: 15/014,247

(22) Filed: Feb. 3, 2016

(65) Prior Publication Data
US 2016/0152749 A1    Jun. 2, 2016

Related U.S. Application Data

(62) Division of application No. 14/177,463, filed on Feb. 11, 2014, now Pat. No. 9,290,588.

(60) Provisional application No. 61/790,960, filed on Mar. 15, 2013.

(30) Foreign Application Priority Data

Feb. 21, 2013  (FR) .................................... 13 51498

(51) Int. Cl.
| | | |
|---|---|---|
| *C08J 3/00* | (2006.01) | |
| *C08F 220/06* | (2006.01) | |
| *C08F 2/32* | (2006.01) | |
| *C08F 20/06* | (2006.01) | |

(52) U.S. Cl.
CPC .............. *C08F 220/06* (2013.01); *C08F 2/32* (2013.01); *C08F 20/06* (2013.01)

(58) Field of Classification Search
CPC ........... C08F 220/06; C08F 2/32; C08F 20/06
See application file for complete search history.

(56) References Cited

U.S. PATENT DOCUMENTS

| | | |
|---|---|---|
| 3,284,393 A | 11/1966 | Vanderhoff et al. |
| 3,724,547 A | 4/1973 | Bott |
| 4,539,368 A | 9/1985 | Duncan et al. |
| 4,656,222 A | 4/1987 | Defazio |
| 4,677,152 A | 6/1987 | Allen et al. |
| 5,216,070 A | 6/1993 | Plochocka et al. |
| 5,380,465 A | 1/1995 | Baker et al. |
| 2004/0028637 A1 | 2/2004 | Villard et al. |
| 2010/0247473 A1 | 9/2010 | Blondel |

FOREIGN PATENT DOCUMENTS

| | | |
|---|---|---|
| EP | 0 161 038 | 11/1985 |
| EP | 0 503 853 | 9/1992 |
| EP | 0 645 429 | 3/1995 |
| FR | 2 810 545 | 12/2001 |
| FR | 2 873 126 | 1/2006 |
| WO | 2005/097834 | 10/2005 |

OTHER PUBLICATIONS

Ge et al., "Investigation on...Acrylic Acid", Chinese Chemical Letters, vol. 13, No. 10, pp. 993-996, 2002.

*Primary Examiner* — Hannah J Pak
(74) *Attorney, Agent, or Firm* — Heslin Rothenberg Farley & Mesiti P.C.

(57) ABSTRACT

The present invention relates to a polymer prepared by polymerization of an aqueous solution of one or more monomers in water-in-oil inverse emulsion, in which one or more of the monomers used comprise(s) at least one acid function, the molar percentage of monomers bearing at least one weak acid function relative to all the monomers used being at least 30%. The polymerization is carried out with a concentration of all the monomers in aqueous solution which falls within the range of from 1.3 mmol to 3.6 mmol per gram of aqueous solution and during the polymerization, at most 20% of the acid functions present on the monomers which have at least one acid function are in neutralized form.

23 Claims, No Drawings

LOW-CONCENTRATION, INVERSE EMULSION OBTAINED BY POLYMERIZATION OF WEAKLY NEUTRALIZED POLYMERS

This application is a Divisional of U.S. Ser. No. 14/177,463 filed on Feb. 11, 2014, which claims priority of Provisional Ser. No. 62/790,960, filed on Mar. 15, 2013.

The invention relates to the technical field of synthetic polymers comprising a weak acid function, conventionally used as thickeners and/or stabilizers for aqueous media, and more precisely to a process for producing polymers obtained via the inverse emulsion polymerization process from at least one monomer bearing a weak acid function, and also to the polymers which can be obtained by means of such a process.

Various types of polymers formed from at least one monomer containing a weak acid function are used as thickeners and/or stabilizers in various types of application. Mention may, for example, be made of patents FR 2 810 545 and FR 2 873 126 or else patent U.S. Pat. No. 3,724,547. Most commonly, in order to obtain the desired thickening and/or stabilizing effect, such polymers are directly prepared in the form of polymers of which the acid functions are at least partially neutralized, most commonly with a degree of neutralization of greater than 50%, or even with a degree of neutralization of 100%. Indeed, it is known from the prior art that the synthetic thickeners obtained by inverse emulsion polymerization and from monomers containing an acid function, for example acrylic acid polymers, must be neutralized totally or with a sufficient degree of neutralization before they are used, in order to obtain a satisfactory thickening effect. Indeed, the conversion of the acid function into salts enables the polymer to change state and to develop the viscosity of an aqueous medium. Patent EP 0 161 038 describes these properties.

When the polymer preparation is directly carried out via a water-in-oil inverse emulsion polymerization process, for feasibility reasons, as in particular explained in document U.S. Pat. No. 5,216,070, it is necessary, in the cases where the desired polymers are prepared from at least one monomer comprising a weak acid function, such as acrylic acid, to use, for carrying out the polymerization reaction, monomers of which the weak acid function is in neutralized form, in order to avoid precipitation problems during the use of a process of preparation via inverse emulsion. Patents U.S. Pat. No. 5,380,465, U.S. Pat. No. 4,539,368 and U.S. Pat. No. 4,656,222, and the publication in Chinese Chemical Letters Vol. 13, No. 10, pp 993-996, 2002, for example, all use a high, or even total, percentage neutralization of the monomers bearing a weak acid function for carrying out an inverse emulsion polymerization reaction. This is because, as indicated in the prior art, and in particular in patent U.S. Pat. No. 5,216,070, the preparation of such polymers in the absence of neutralization of the monomers bearing a weak acid function that are used, directly via the inverse emulsion polymerization process, poses a precipitation/destabilization problem. Indeed, as indicated in particular in document U.S. Pat. No. 3,284,393, the preparation of a polyacrylic acid latex via such a process (as specified in example 3) poses a stability problem, the latex obtained having to be flocculated and concentrated with hydrochloric acid in order to obtain the polymer by filtration.

The polymers obtained by inverse emulsion polymerization are widely used as a rheology modifier. Thus, polymers in this field which exhibit improved properties in terms of viscosity and thickening and/or stabilizing capacities are still sought. Patent application WO 2005/097834, for example, provides a process for preparing a polymer comprising acid functions in inverse emulsion form with improved thickening properties. The polymers have a percentage neutralization of from 25% to 100%, preferentially from 30% to 40%.

In this context, one of the objectives of the applicant has been to develop polymers obtained by inverse emulsion polymerization which exhibit improved thickening performance levels. The invention provides a novel process which makes it possible to achieve such an objective.

In the context of the invention, the applicant has been interested in the preparation, via water-in-oil inverse emulsion polymerization, of inverse emulsions of polymers comprising a high molar percentage of monomers bearing one or more weak acid function(s) relative to all the monomers used, and in particular comprising at least 30 mol % of monomers bearing at least one weak acid function. With such a level of monomers bearing a weak acid function, the inventors have demonstrated that the properties of the polymer obtained are actually dependent, on the one hand, on the degree of neutralization of the acid functions of the monomers used during the polymerization and, on the other hand, on the total concentration of monomers in the aqueous phase. In a manner which is original compared with the approaches proposed in the prior art which recommend carrying out the polymerization with a high degree of neutralization of the acid functions, the applicant has turned, in the context of the invention, toward a process for inverse emulsion polymerization of polymers exhibiting a low degree of neutralization and, in particular, a degree of neutralization of the acid functions present of at most 20%.

In the context of the invention, the applicant provides a process for preparing such a polymer, by polymerization of an aqueous solution of monomers in water-in-oil inverse emulsion, in which the polymerization is carried out with a concentration of all the monomers which falls within the range of from 1.3 mmol to 3.6 mmol per gram of aqueous solution. Furthermore, the applicant has demonstrated that such a concentration range, contrary to the higher concentrations in particular used in the prior art, is compatible with the obtaining of a polymer with a low degree of neutralization of the weak acid functions present and makes it possible to dispense with stability problems observed in the prior art.

In this context, the present invention relates to a process for preparing a polymer by polymerization of an aqueous solution of one or more monomers in water-in-oil inverse emulsion, in which one or more of the monomers used comprise(s) at least one acid function, the molar percentage of monomers bearing at least one weak acid function relative to all the monomers used being at least 30%, wherein:
   i) the polymerization is carried out with a concentration of all the monomers in aqueous solution which falls within the range of from 1.3 mmol to 3.6 mmol per gram of aqueous solution,
   ii) during the polymerization, at most 20% of the add functions present on the monomers used which have at least one acid function are in neutralized form.

In particular, during the polymerization, at most 10%, preferably at most 5%, and preferentially at most 2%, of the acid functions present on the monomers used which have at least one acid function are in neutralized form, thereby making it possible to obtain thickening properties which are even more advantageous. According to one particular embodiment, 100% of the acid functions present on the monomers used are in free acid form during the polymerization.

In the context of the invention, optimally, the polymerization is carried out with a total concentration of monomers present in the aqueous solution which falls within the range of from 1.7 to 3.3 mmol per gram of aqueous solution. In the context of the invention, the monomer concentrations are given relative to the total weight of aqueous solution (also known as aqueous phase), i.e. weight of monomers included.

In particular, it is therefore possible to carry out the polymerization with the following combinations:
- a concentration of all the monomers in aqueous solution which falls within the range of from 1.3 mmol to 3.6 mmol per gram of aqueous solution, with at most 20%, advantageously at most 10%, preferably at most 5%, and preferentially at most 2%, or even 0%, of the acid functions present on the monomers which have at least one acid function being in neutralized form,
- a concentration of all the monomers in aqueous solution which falls within the range of from 1.7 mmol to 3.3 mmol per gram of aqueous solution, with at most 20%, advantageously at most 10%, preferably at most 5%, and preferentially at most 2%, or even 0%, of the acid functions present on the monomers which have at least one acid function being in neutralized form.

The molar percentage of monomers bearing at least one weak acid function relative to all the monomers used is preferentially at least 50%, preferentially at least 70%, and very preferentially at least 80%. Such molar percentages can be used with any of the monomer concentration/degree of neutralization combinations previously mentioned.

In the context of the invention, the polymerization will preferably be carried out with monomers which all have at least one ethylenic unsaturation.

Preferably, the polymerization is carried out with a single monomer bearing at least one weak acid function, the molar percentage of which relative to all the monomers used is at least 30%, which in free acid form is chosen from acrylic acid, methacrylic acid, itaconic acid, crotonic acid, maleic acid and fumaric acid. The monomer bearing at least one weak acid function is very preferentially acrylic acid in free acid form or with a degree of neutralization in accordance with the invention. It is also possible to use several monomers bearing at least one weak acid function, in particular chosen from those previously listed, the total molar percentage of which relative to all the monomers used is at least 30%. Preferably, one of these monomers is acrylic acid in free acid form or with a degree of neutralization in accordance with the invention.

The polymerization can be carried out with at least one monomer bearing at least one strong acid function. In this case, the polymerization is preferably carried out with a concentration of monomers bearing at least one strong acid function, relative to all the monomers used, of less than 50%, and preferentially of less than 30%. The polymerization can, for example, be carried out with a monomer bearing at least one strong acid function which in free acid form is chosen from acrylamidoalkylsulfonic acids, such as 2-acrylamido-2-methylpropanesulfonic acid (ATBS). In this case, the polymerization can, for example, be carried out with an acrylic acid/ATBS or acrylic acid/ATBS/acrylamide combination, the acid monomers possibly being in free acid form or with a degree of neutralization in accordance with the invention.

A subject of the invention is also the polymers which can be obtained by means of a process according to the invention, regardless of the implementation variants thereof.

In the context of the invention, it has been noted that, by selecting a monomer concentration which falls within the range of from 1.3 mmol to 3.6 mmol per gram of aqueous solution for carrying out the inverse emulsion polymerization reaction, it is possible to prepare inverse emulsions of polymers bearing an acid function with a low degree of neutralization, or even no neutralization, which are stable, i.e. without the observation of a rapid precipitation phenomenon. Furthermore, it has been demonstrated that such a concentration range, contrary to the higher concentrations in particular used in the prior art, combined with a weak neutralization of the acid functions present, makes it possible to obtain polymers which provide a thickening and/or stabilizing effectiveness, after a step of at least partial neutralization, which is greater than the prior art polymers obtained by inverse emulsion polymerization.

The expression "monomer bearing at least one acid function" is intended to mean a monomer bearing one or more free or neutralized (i.e. salified by the action of base) acid function(s). When a monomer comprises more than one acid function, it is possible to have only a part of the acid functions in neutralized form. The acid function(s) present may be a weak acid or strong acid function. In general, the monomers used comprise only weak acid functions or only strong acid functions, and most commonly, monomers bearing a single acid function will be used.

By way of example of a monomer bearing at least one weak acid function in free acid form, of the —COOH type, mention may be made of acrylic acid, methacrylic acid, itaconic acid and crotonic acid, which all comprise just one weak acid function, and maleic acid and fumaric acid which, for their part, comprise two weak acid functions.

By way of example of a monomer bearing a strong acid function in free acid form, mention may be made of monomers bearing a phosphonic acid or sulfonic acid function, for instance acrylamidoalkylsulfonic acids such as 2-acrylamido-2-methylpropanesulfonic acid.

In their neutralized form, the acid functions are in anionic form with a counterion or cation depending on the base used for the neutralization, for example of the $Na^+$ type when sodium hydroxide is used or else the $NH_4^+$ type when aqueous ammonia is used. Conventionally, the control of the number of acid functions in neutralized form is provided by the choice of the pH of the aqueous solution of monomers, which will be adjusted according to the pKa of the acid functions present.

The polymerization can involve a single type of monomer, which is then chosen from monomers bearing at least one weak acid function or various monomer types, at least one of which bears at least one weak acid function, with a proportion of the acid functions present on the monomers used, and therefore on the copolymer obtained, in a neutralized form, which is less than or equal to 20%. In particular, in addition to the monomer(s) bearing at least one weak acid function previously described, the polymer obtained may contain other monomers, such as monomers bearing at least one strong acid function, neutral (or nonionic) monomers, cationic monomers and/or monomers with a hydrophobic nature. Whatever the case, the conditions for aqueous phase formation and for polymerization are such that the acid functions of the monomers involved remain predominantly in free acid form, and are not neutralized by formation of a salified form, or weakly neutralized with a limited degree of neutralization of less than or equal to 20%. When a neutralization of less than or equal to 20% takes place, it is generally carried out in the aqueous phase, by adding an appropriate amount of base. A base such as sodium hydroxide or aqueous ammonia may be used.

In particular, the polymerization reaction can be carried out with at least one neutral monomer chosen from acrylamide, methacrylamide, N,N-dimethylacrylamide, N-vinylmethylacetamide, N-vinylformamide, vinyl acetate, diacetone acrylamide, N-isopropylacrylamide, N-[2-hydroxy-1,1-bis(hydroxymethyl)ethyl]propenamide, (2-hydroxyethyl)acrylate, (2,3-dihydroxypropyl)acrylate, methyl methacrylate, (2-hydroxyethyl)methacrylate, (2,3-dihydroxypropyl)methacrylate, vinylpyrrolidone, or other acrylic esters, or other ethylenically unsaturated esters. For example, the polymerization can be carried out with from 30 to 99 mol % of at least one monomer which has one or more weak acid function(s) and from 1 to 70 mol % of at least one neutral monomer. The polymerization can, for example, be carried out with an acrylic acid/acrylamide combination, the acrylic acid being in neutral form or having a degree of neutralization in accordance with the invention.

It is also possible to carry out a copolymerization with at least one cationic monomer. By way of example of cationic monomers, mention may be made of diallyldialkylammonium salts, for instance diallyldimethylammonium chloride (DADMAC); acidified or quaternized salts of dialkylaminoalkyl acrylates and methacrylates, in particular of dialkylaminoethyl acrylate (ADAME) and of dialkylaminoethyl methacrylate (MADAME); acidified or quaternized salts of dialkylaminoalkylacrylamides or methacrylamides, for instance methacrylamidopropyltrimethylammonium chloride (MAPTAC), acrylamidopropyltrimethylammonium chloride (APTAC) and Mannich products such as quaternized dialkylaminomethylacrylamides.

The acidified salts are obtained via the means known to those skilled in the art, and in particular by protonation. The quaternized salts are also obtained via the means known to those skilled in the art, in particular by reaction with benzyl chloride, methyl chloride (MeCl), aryl chlorides, alkyl chlorides, or dimethyl sulfate.

It is also possible to carry out a copolymerization with at least one monomer with a hydrophobic nature. By way of examples of monomers with a hydrophobic nature, mention may be made of undecanoic acid acrylamide, undodecyl acid methyl acrylamide, and acrylic acid derivatives such as alkyl acrylates or methacrylates, for instance ethoxylated (25) behenyl methacrylate.

According to a first variant of the process according to the invention, all the monomers bearing at least one acid function that are used to carry out the polymerization are monomers bearing at least one weak acid function.

According to a second variant of the process according to the invention, the polymerization is carried out with at least one monomer bearing at least one strong acid function, in addition to at least one monomer bearing at least one weak acid function. In this case, the molar percentage of monomers bearing at least one strong acid function relative to all the monomers used is preferentially less than 50%, very preferentially less than 30%.

The copolymers obtained according to the process of the invention can in particular be made up of a combination of at least one monomer bearing at least one weak acid function and of at least one monomer bearing at least one strong acid function, and in particular of an acrylic acid/ATBS combination, these acid monomers being in neutral form or having a degree of neutralization in accordance with the invention; made up of a combination of at least one monomer bearing at least one weak acid function with at least one neutral monomer and optionally at least one monomer bearing at least one strong acid function, and in particular of an acrylic acid/acrylamide combination or of an acrylic acid/ATBS/acrylamide combination, the acrylic acid and the ATBS being in neutral form or having a degree of neutralization in accordance with the invention; made up of a combination of at least one monomer bearing at least one weak acid function with at least one cationic monomer and optionally at least one monomer bearing at least one strong acid function; or else made up of a combination of at least one monomer bearing at least one weak acid function with at least one neutral monomer and at least one cationic monomer and optionally at least one monomer bearing at least one strong acid function.

The monomers are put into an aqueous solution. This aqueous solution corresponds to the aqueous phase of the inverse emulsion. In accordance with the invention, in the aqueous solution used for the polymerization, at most 20% of the acid functions present on the monomers which have at least one acid function are in neutralized form.

The process according to the invention is particularly suitable for the preparation of water-soluble or water-swelling polymers.

The term "water-soluble polymer" is intended to mean a polymer which, when put into solution by means of stirring in water at a temperature of 25° C. at a concentration of 50 g/l, gives a solution free of insoluble particles.

The term "water-swelling polymer" is intended to mean a polymer which, when put into solution in water at a temperature of 25° C., swells and thickens the solution.

The polymers obtained in the context of the invention may be linear, structured or crosslinked. The term "structured polymer" is intended to mean branched polymers, in star form or in comb form. These branched polymers are, conventionally, nonlinear polymers which have side chains. The term "crosslinked polymer" is intended to mean, conventionally, a nonlinear polymer which is in the form of a three-dimensional network which is water-insoluble, but water-swellable.

When the polymer obtained is branched or crosslinked, it is branched or crosslinked more particularly with a monomer comprising two or more ethylenic unsaturations. To form a branched or crosslinked polymer, at least one monomer acting as a branching agent is integrated into the aqueous phase. Such an agent is, for example, chosen from methylenebisacrylamide (MBA), ethylene glycol diacrylate, polyethylene glycol dimethacrylate, diacrylamide, cyanomethyl acrylate, vinyloxyethyl acrylate, vinyloxy methacrylate, triallylamine, formaldehyde, glyoxal, glycidyl ethers such as ethylene glycol diglycidyl ether, and epoxies, and mixtures thereof.

It should be specified that, in the context of the invention, the total concentration of monomers includes the monomers acting as a branching agent.

The process according to the invention is advantageous for the preparation of any structure of linear, structured or crosslinked polymers and is particularly suitable for the preparation of branched or crosslinked polymers.

It is also possible to use a transfer agent, otherwise known as a chain limiter. The use of a transfer agent is particularly advantageous for controlling the molecular weight of the polymer obtained. By way of example of a transfer agent, mention may be made of methanol, isopropanol, sodium hypophosphite, 2-mercaptoethanol and sodium methallyl sulfonate, and mixtures thereof. Those skilled in the art will adjust, in a known manner, the amounts of branching agent, and optionally of transfer agent, that are used according to whether they wish to obtain a branched polymer or a crosslinked polymer.

In greater detail, the process according to the invention comprises the following steps:
a) providing an aqueous solution of the monomer(s) selected, termed aqueous phase,
b) emulsifying said aqueous solution in a water-immiscible phase, termed oil phase,
c) carrying out the polymerization reaction.

Of course, the aqueous solution of step a) has a total concentration of monomers, a molar percentage of monomers bearing at least one weak acid function relative to all the monomers used and a degree of neutralization of the acid functions present on the monomers which have at least one acid function, which are in accordance with the invention.

In order to obtain the desired thickening effect, the polymerization is most commonly followed by a neutralization step, otherwise known as post-neutralization step, for neutralizing at least a part, or even all, of the free acid functions present on the polymer. In the case where a step of at least partial neutralization of the free acid functions present in the polymer obtained is carried out after the polymerization reaction, it preferably results in a percentage neutralization relative to all the acid functions present on the polymer of from 30% to 100%.

Such a post-neutralization step can be carried out in various ways:
the post-neutralization can be carried out on the inverse emulsion obtained at the end of the process according to the invention. This is generally the case when the manufacturer itself neutralizes the polymer in inverse emulsion form.
the post-neutralization can be carried out on an aqueous solution obtained following the inversion of the inverse emulsion in water. This is generally the case when the final user uses the inverse emulsion, or the powder ensuing therefrom, in an aqueous solution, called stock solution, before adding the latter to the medium to be thickened or to be stabilized. Said final user then has the freedom to adjust the polymer concentration of the solution, the degree of neutralization and the nature of the neutralizing agents.
the post-neutralization can also be carried out on the composition containing the inverse emulsion or the powder ensuing therefrom. Such a composition comprises other ingredients according to the intended application. This is generally the case when the final user uses the inverse emulsion, or the powder ensuing therefrom, directly in a composition to be thickened or to be stabilized. In the same way as the previous case, the user has the freedom to adjust the degree of neutralization and the nature of the neutralizing agents.

The neutralization is carried out by virtue of a base, in a manner similar to the previously described neutralization of the monomers, the nature and the amounts of which are selected by those skilled in the art.

In general, the polymerization reaction is carried out in the presence of a water-in-oil emulsifier. The latter is most commonly introduced into the oil phase in which the aqueous solution is emulsified. The term "emulsifier of the water-in-oil (W/O) type" is intended to mean an emulsifier which has an HLB value sufficiently low to provide water-in-oil emulsions, and in particular an HLB value of less than 10.

The HLB value is calculated according to the following relationship:

$$HLB = (\% \text{ by weight of the hydrophilic part})/5$$

The percentage by weight of the hydrophilic part being the ratio of the molecular weight of the hydrophilic part to the total molecular weight of the molecule.

By way of example of such water-in-oil emulsifiers, mention may be made of surfactant polymers such as polyesters having a molecular weight of between 1000 and 3000, products of condensation between a poly(isobutenyl) succinic acid or the anhydride thereof and a polyethylene glycol, block copolymers having a molecular weight of between 2500 and 3500, for example those sold under the Hypermer® names, sorbitan extracts, for instance sorbitan monooleate, sorbitan isostearate or sorbitan sesquioleate, certain polyethoxylated sorbitan esters, for instance pentaethoxylated sorbitan monooleate or pentaethoxylated sorbitan isostearate, or else diethoxylated oleocetyl alcohol or tetraethoxylated lauryl acrylate.

The aqueous solution contains the monomer(s) and optionally the branching agent and the transfer agent. It may also contain complexing agents such as ethylenediamine or ethylenediaminetetraacetic acid.

Most commonly, the polymerization reaction of step c) is initiated by introducing into the emulsion formed in step b) a free radical initiator. By way of example of a free radical initiator, mention may be made of redox couples, with cumene hydroperoxide or tertiary butylhydroxyperoxide among the oxidizing agents, and persulfates such as sodium metabisulfite and the Mohr salt among the reducing agents. Azo compounds such as 2,2'-azobis(isobutyronitrile) and 2,2'-azobis(2-amidinopropane)hydrochloride can also be used.

Conventionally, the polymerization is generally carried out isothermally, adiabatically or at controlled temperature. That is to say the temperature is kept constant, generally between 10 and 50° C. (isotherm), or else the temperature is left to increase naturally (adiabatic) and in this case the reaction is generally begun at a temperature below 10° C. and the final temperature is generally above 50° C., or, finally, the temperature increase is controlled so as to have a temperature curve between the isotherm curve and the adiabatic curve.

In the context of the process according to the invention, it is possible to introduce, at the end of the polymerization reaction, one or more oil-in-water emulsifiers, preferably at a temperature below 50° C.

The term "emulsifier of the oil-in-water (O/W) type" is intended to mean an emulsifier which has an HLB value sufficiently high to provide oil-in-water emulsions and in particular an HLB value of greater than 10. By way of example of such oil-in-water emulsifiers, mention may be made of ethoxylated sorbitan esters such as sorbitan oleate ethoxylated with 20 equivalents of ethylene oxide (EO 20), sorbitan laurate polyethoxylated with 20 mol of ethylene oxide, castor oil polyethoxylated with 40 mol of ethylene oxide, decaethoxylated oleodecyl alcohol, heptaethoxylated lauryl alcohol, or sorbitan monostearate polyethoxylated with 20 mol of ethylene oxide.

In the context of the invention, the amounts of emulsifier(s) introduced are such that the inverse emulsion of the polymer obtained will generally contain from 1% to 10% by weight, and preferably from 2.5% to 9% by weight, of emulsifiers of the water-in-oil (W/O) type and, optionally, from 2% to 10% by weight, and preferably from 2.5% to 6% by weight, of emulsifiers of the oil-in-water (O/W) type.

In general, the weight ratio of the aqueous phase to the oil phase is from 50/50 to 90/10.

The oil phase may be composed, for example, of a mineral oil, in particular a commercial mineral oil, containing saturated hydrocarbons of paraffinic, isoparaffinic, cycloparaffinic or naphthyl type having, at ambient temperature (22° C.), a density between 0.7 and 0.9; of a vegetable oil; of a synthetic oil such as hydrogenated polydecene or hydrogenated polyisobutene; of an ester such as octyl stearate or butyl oleate; of a vegetable oil such as squalane of vegetable origin; or of a mixture of several of these oils.

At the end of the polymerization reaction, it is also possible for the emulsion obtained to be diluted or concentrated. In particular, it is possible to concentrate the obtained emulsion by distillation or else to completely dry it, in order to obtain a powder. Such concentration or drying will be carried out with or without prior introduction of an emulsifier of the oil-in-water (O/W) type.

A subject of the present invention is also the polymers in the form of a water-in-oil inverse emulsion that are obtained by means of the process according to the invention, whatever the implementation variant thereof.

The polymers obtained according to the process of the invention generally require a neutralization step before they are used as a thickener and/or stabilizer. Without an additional neutralization step, in the polymers according to the invention, at most 20% of the acid functions present are in neutralized form, preferably at most 10%, even more preferably at most 5%, and preferentially at most 2%. This low degree of neutralization of the acid functions present provides the user with great flexibility in terms of use, allowing the latter to adjust the properties of the polymer and therefore the desired effect, in particular the thickening and/or stabilizing effect, at the time of use, by subsequently adjusting the degree of neutralization to his needs. Such an approach also allows the user to select the nature of the neutralizing agent used, compatible with the targeted use. The invention also relates to such polymers subsequently subjected to a neutralization step resulting in a percentage of neutralized acid functions relative to all the acid functions present on the polymer of from 30% to 100%.

These polymers thus neutralized provide much better thickening properties, all conditions being otherwise equal, compared with the polymers obtained by inverse emulsion polymerization not complying with the conditions of concentration and neutralization of the monomers as defined in the process according to the invention. Particularly after neutralization, the polymers provide advantageous properties compared with polymers consisting of the same monomers, but prepared by inverse emulsion polymerization directly at higher degrees of neutralization and/or at a different total concentration of monomers.

Advantageously, the polymers obtained by means of the process according to the invention make it possible, after complete neutralization of the free acid functions present, or at least greater neutralization, to thicken and/or stabilize aqueous media much more effectively.

The inverse emulsions obtained using the process according to the invention can be concentrated, for example by distillation. Inverse emulsions of which the polymer concentration may be between 30% and 75% by weight, preferentially between 40% and 65% by weight, are then obtained.

The polymers obtained from the inverse emulsions of the invention subsequently subjected to an isolation step, so as to be in the form of a powder, are also an integral part of the invention. Such an isolation step can, for example, be chosen from precipitation, azeotropic distillation and spray-drying techniques.

Indeed, in the context of the invention, it is possible to concentrate or isolate the polymer in the form of an inverse emulsion obtained directly on exiting the process according to the invention, without loss of the advantageous properties of the polymers obtained. There are in particular numerous processes for obtaining powder from inverse emulsions of polymers, which consist in isolating the active material from the other constituents of the emulsion, for instance:

precipitation from a nonsolvent medium, such as acetone, methanol or any other polar solvent in which the polymer is not soluble. Simple filtration then makes it possible to isolate the polymer particle;

azeotropic distillation in the presence of an agglomerating agent and of stabilizing polymer makes it possible to produce agglomerates that are easily isolated by filtration before carrying out the drying of the particle;

spray-drying consists in creating a cloud of fine droplets of emulsions in a hot air stream, for a controlled period of time.

I. EXAMPLES OF PREPARATION OF ACRYLIC ACID/SODIUM ACRYLATE-BASED HOMOPOLYMER

Example 1

The ingredients of the aqueous phase are charged to a 1 l beaker with magnetic stirring:
150 g of glacial acrylic acid
605 g of deionized water
0.023 g of sodium hypophosphite
0.10 g of sodium diethylenetriaminepentaacetate
0.075 g of methylenebisacrylamide
0.15 g of sodium bromate.

Next, in a 1 l glass reactor, with magnetic stirring, the organic phase is prepared with:
102 g of aliphatic hydrocarbon (Isopar L)
98 g of white mineral oil (Marcol 152)
20 g of sorbitol monooleate
25 g of polymeric stabilizer (Hypermer 1083).

The aqueous phase is gradually transferred into the organic phase. The pre-emulsion thus formed is then subjected to strong shearing for 1 minute (Ultra Turrax, IKA).

The inverse emulsion is then degassed for 30 minutes by means of simple nitrogen sparging.

An aqueous solution containing 1.0% by weight of sodium metabisulfite is then added at a flow rate of 2.5 ml/h for a period of 1 h 30. Once the maximum temperature has been reached, the temperature of the reaction mixture is maintained for 60 minutes before cooling.

Finally, 40 g of ethoxylated (6 mol) tridecyl alcohol are added at around 30° C.

Example 2

The ingredients of the aqueous phase are charged to a 1 l beaker with magnetic stirring:
175 g of glacial acrylic acid
580 g of deionized water
0.03 g of sodium hypophosphite
0.10 g of sodium diethylenetriaminepentaacetate
0.087 g of methylenebisacrylamide
0.15 g of sodium bromate.

Next, the preparation of the organic phase and the rest of the preparation process are carried out in accordance with Example 1.

Example 3

The ingredients of the aqueous phase are charged to a 1 l beaker with magnetic stirring:

100 g of glacial acrylic acid
655 g of deionized water
0.02 g of sodium hypophosphite
0.10 g of sodium diethylenetriaminepentaacetate
0.05 g of methylenebisacrylamide
0.15 g of sodium bromate.

Next, the preparation of the organic phase and the rest of the preparation process are carried out in accordance with Example 1.

Example 4

Neutralization 3.5%/Concentration 2.76

The same process as in Example 1 is carried out, with 5.83 g of 50% sodium hydroxide solution being added to the aqueous phase, while at the same time maintaining the same weight of aqueous phase by adjusting the amount of deionized water.

Example 5

Neutralization 19%/Concentration 3.5

The ingredients of the aqueous phase are charged to a 1 l beaker with magnetic stirring:
190 g of glacial acrylic acid
40 g of 50% sodium hydroxide solution
525 g of deionized water
0.03 g of sodium hypophosphite
0.10 g of sodium diethylenetriaminepentaacetate
0.095 g of methylenebisacrylamide
0.15 g of sodium bromate.

Next, the preparation of the organic phase and the rest of the preparation process are carried out in accordance with Example 1.

Comparative Example 1

The ingredients of the aqueous phase are charged to a 1 l beaker with magnetic stirring:
50 g of glacial acrylic acid
705 g of deionized water
0.01 g of sodium hypophosphite
0.10 g of sodium diethylenetriaminepentaacetate
0.043 g of methylenebisacrylamide
0.15 g of sodium bromate.

Next, the preparation of the organic phase and the rest of the preparation process are carried out in accordance with Example 1.

Comparative Example 2

The ingredients of the aqueous phase are charged to a 1 l beaker with magnetic stirring:
199 g of glacial acrylic acid
115 g of 50% sodium hydroxide solution
441 g of deionized water
0.03 g of sodium hypophosphite
0.10 g of sodium diethylenetriaminepentaacetate
0.15 g of methylenebisacrylamide
0.15 g of sodium bromate.

Next, the preparation of the organic phase and the rest of the preparation process are carried out in accordance with Example 1.

Comparative Example 3

The ingredients of the aqueous phase are charged to a 1 l beaker with magnetic stirring:
199 g of glacial acrylic acid
556 g of deionized water
0.03 g of sodium hypophosphite
0.10 g of sodium diethylenetriaminepentaacetate
0.1 g of methylenebisacrylamide
0.15 g of sodium bromate.

Next, the preparation of the organic phase is carried out in accordance with Example 1.

The aqueous phase is gradually transferred into the organic phase. The pre-emulsion thus formed is then subjected to strong shearing for 1 minute (Ultra Turrax, IKA).

The inverse emulsion is then degassed for 30 minutes by means of simple nitrogen sparging.

An aqueous solution containing 1.0% by weight of sodium metabisulfite is then added at a flow rate of 2.5 ml/h. Immediately after the beginning of the addition of this reducing solution, the emulsion is destabilized and then coagulates. Polymerization is impossible, the system is not stable.

Comparative Example 4

The ingredients of the aqueous phase are charged to a 1 l beaker with magnetic stirring:
150 g of glacial acrylic acid
83 g of 50% sodium hydroxide solution
522 g of deionized water
0.023 g of sodium hypophosphite
0.10 g of sodium diethylenetriaminepentaacetate
0.75 g of methylenebisacrylamide
0.15 g of sodium bromate.

Next, the preparation of the organic phase and the rest of the preparation process are carried out in accordance with Example 1.

Polymer Characterization

Procedure: Measurement of the viscosity of the aqueous solution of polymer at isoconcentration [0.16% by weight]

250 g of deionized water are placed in a 400 ml beaker and then, with mechanical stirring (three-blade—500 revolutions per minute), the desired amount of inverse emulsion is gradually added so as to obtain a solution containing 0.16% by weight of active polymer. The pH is then adjusted to 7+/−0.1 with sodium hydroxide. At this pH, 100% of the acid functions present on the polymer are neutralized. The solution is left stirring for 15 minutes and then left to stand for 5 minutes. The viscosity is then measured using a Brookfield RVT viscometer with module 4 and a rotational speed of 20 revolutions per minute.

The results are recorded in Table 1.

TABLE 1

| Example | Acid function neutralization (%) | Monomer concentration in mmol/g of aqueous phase | Viscosity 0.16% in water (cps) |
|---|---|---|---|
| 1 | 0% | 2.8 | 6500 |
| 2 | 0% | 3.2 | 4000 |
| 3 | 0% | 1.8 | 6200 |
| 4 | 3.5% | 2.8 | 6500 |
| 5 | 19% | 3.5 | 2500 |
| Comparative 1 | 0% | 0.9 | 1700 |
| Comparative 2 | 52% | 3.7 | 500 |
| Comparative 3 | 0% | 3.7 | Emulsion not stable |

TABLE 1-continued

| Example | Acid function neutralization (%) | Monomer concentration in mmol/g of aqueous phase | Viscosity 0.16% in water (cps) |
|---|---|---|---|
| Comparative 4 | 50% | 2.8 | 1500 |
| Comparative 5-ET75 | 50% | 3.8 | 50 |

ET75 is a commercial inverse emulsion of acrylic acid homopolymer, of which 50% of the acid functions were neutralized before polymerization.

The polymers obtained by means of the inverse emulsion polymerization process according to the invention have a much better thickening effect than the polymers obtained by means of inverse emulsion processes which do not comply with the conditions of the invention.

The polymers obtained in accordance with the invention are very effective at very low concentration.

II. COMPARATIVE STUDY RELATIVE TO THE INVERSE EMULSION PROCESSES AND POLYMERS PROPOSED IN THE PRIOR ART

The thickening effect of polymers obtained by inverse emulsion polymerization, as described in the prior art, and of polymers obtained according to the invention, all other conditions being otherwise equal, was compared.

The examples of various prior art documents were reproduced and then only the concentration and/or the percentage neutralization was (were) modified in order to correspond to the invention. Next, the inverse emulsions were used and the viscosities were measured according to the same protocol as that described previously.

In what follows, AA denotes acrylic acid, AM denotes acrylamide and ATBS denotes 2-acrylamido-2-methylpropanesulfonic acid.

a. EP 0 161 038

Examples 1A and 1B described on pages 5-6 of patent EP 0 161 038 were reproduced. These examples 1A and 1B were then modified in order to correspond to the invention.

Example 6

Example 6 corresponds to Example 1A in which the amounts of acrylamide, acrylic acid and MBA monomers were reduced and replaced with deionized water, so as to obtain the same amount of aqueous phase, and a total concentration of monomers of 2.8 mmol/g of aqueous phase, instead of 4.9.

Example 7

Example 7 corresponds to Example 1A in which the same type of adjustment as in Example 6 was carried out, so as to obtain a total concentration of monomers of 3.5 mmol/g of aqueous phase, instead of 4.9.

Example 8

Example 8 corresponds to Example 1B in which the same type of adjustment regarding the monomers as previously and also an addition of aqueous ammonia so as to neutralize 20% of the acid functions were carried out, so as to obtain a total concentration of monomers of 2.8 mmol/g of aqueous phase, instead of 4.9.

Example 9

Example 9 corresponds to Example 1B in which the same type of adjustment as in Example 8 was carried out, so as to obtain a total concentration of monomers of 3.5 mmol/g of aqueous phase, instead of 4.9.

The results are recorded in Table 2.

TABLE 2

| Example | Acid function neutralization (%) | Monomers ratio (mol %) | [monomers] mmol/g aqueous phase | Viscosity 0.16% in water (cps) |
|---|---|---|---|---|
| Ex 1A from EP 0 161 038 | 0% | AA: 80% AM: 20% | 4.9 | Coagulation-the emulsion is not stable |
| 6 | 0% | AA: 80% AM: 20% | 2.8 | 6800 |
| 7 | 0% | AA: 80% AM: 20% | 3.5 | 4500 |
| Ex 1B from EP 0 161 038 | 20% | AA: 80% AM: 20% | 4.9 | 50 |
| 8 | 20% | AA: 80% AM: 20% | 2.8 | 6800 |
| 9 | 20% | AA: 80% AM: 20% | 3.5 | 5500 |

These examples confirm the advantage of combining a low concentration of monomers with a weak neutralization of the monomers comprising an acid function. Such a choice makes it possible to considerably improve the thickening properties obtained.

b. EP 0 503 853

Examples 1, 2 and 7 described on pages 5-6 of patent EP 0 503 853 were reproduced. These Examples 1, 2 and 7 were then modified in order to correspond to the invention.

Example 10

Example 10 corresponds to Example 1 in which the amounts of acrylic acid monomer and of NaOH were reduced and replaced with deionized water so as to obtain the same amount of aqueous phase, a total concentration of monomers of 3.4 mmol/g of aqueous phase, instead of 4.3, and an acid function neutralization of 15% instead of 100%.

Example 11

Example 11 corresponds to Example 2 in which the amounts of acrylic acid monomer, of NaOH and of MBA were reduced and replaced with deionized water so as to obtain the same amount of aqueous phase, a total concentration of monomers of 3.4 mmol/g of aqueous phase, instead of 4.3, and an acid function neutralization of 15% instead of 100%.

Example 12

Example 12 corresponds to Example 7 in which the amounts of acrylamide and acrylic acid monomers and of MBA and also of NaOH were reduced and replaced with deionized water so as to obtain a total concentration of monomers of 3.4 mmol/g of aqueous phase, instead of 4.3, and an acid function neutralization of 15% instead of 100%.

The results are recorded in Table 3.

TABLE 3

| Example | Acid function neutralization (%) | Monomer(s) ratio (mol %) | [monomer(s)] mmol/g aqueous phase | Viscosity 0.16% in water (cps) |
|---|---|---|---|---|
| Ex 1 from EP 0 503 853 | 100% | AA: 100% without branching agent | 4.3 | 10 |
| 10 | 15% | AA: 100% without branching agent | 3.4 | 20 |
| Ex 2 from EP 0 503 853 | 100% | AA: 100% with branching agent | 4.3 | 20 |
| 11 | 15% | AA: 100% with branching agent | 3.4 | 6500 |
| Ex 7 from EP 0 503 853 | 100% | AM: 50% AA: 50% with branching agent | 4.3 | 50 |
| 12 | 15% | AM: 50% AA: 50% with branching agent | 3.4 | 4500 |

These tests also show the advantage of the process according to the invention compared with the prior art processes. Even in the case of the linear polymers (Example 1 from EP 0 503 853 and Example 10) in which the viscosity remains low, the viscosity obtained doubles when the process according to the invention is used, which corresponds to a considerable improvement in performance levels.

The combination of the two essential characteristics of the invention, namely a low concentration of monomers in the aqueous phase combined with a low degree of neutralization of the monomers comprising acid functions makes it possible to obtain polymers which provide a greatly improved thickening effect, with or without the presence of a branching agent.

c. WO 2005/097834

Example 2 described on page 14 of patent WO 2005/097834 was reproduced. The percentage neutralization and the monomer concentration were then lowered in order to correspond to the invention (Example 13).

The results are recorded in Table 4.

TABLE 4

| Example | Neutralization | Monomer ratio (mol %) | [monomer] mmol/g aqueous phase | Viscosity 0.16% in water (cps) |
|---|---|---|---|---|
| Ex 2 from WO 2005/097834 | 37.5% | AA: 100% | 4.7 | 20 |
| Example 13 | 18% | AA: 100% | 3.4 | 2500 |

Once again, these tests show the advantage of the process according to the invention compared with the prior art processes, since it makes it possible to considerably improve the thickening capacity of the polymers obtained.

d. U.S. Pat. No. 4,677,152

Example 2, column 8, of patent U.S. Pat. No. 4,677,152 was reproduced. The percentage neutralization and the monomer concentration were then lowered in order to correspond to the invention (Example 14).

The results are recorded in Table 5.

TABLE 5

| Example | Acid function neutralization | Monomers ratio | [monomers] mmol/g aqueous phase | Viscosity 0.16% in water (cps) |
|---|---|---|---|---|
| Ex 2 from U.S. Pat. No. 4,677,152 | 76% | AM: 20% AA: 80% | 3.7 | 1500 |
| Example 14 | 18% | AM: 20% AA: 80% | 3.4 | 5500 |

Here again, the combination of the two essential characteristics of the invention, namely a low concentration of monomers in the aqueous phase combined with a low degree of neutralization of the monomers comprising acid functions makes it possible to obtain polymers which provide a greater thickening effect.

e. EP 0 645 429

Example 3 on page 5 of patent application EP 0 645 429 was reproduced. The percentage neutralization was then lowered in order to correspond to the invention (Examples 15 and 16).

The results are recorded in Table 6.

TABLE 6

| Example | Acid function neutralization | Monomers ratio (mol %) | [monomers] mmol/g aqueous phase | Viscosity 0.16% in water (cps) |
|---|---|---|---|---|
| Ex 3 from EP 0 645 429 | 73% | AA: 90% ATBS: 10% | 3.6 | 500 |
| Example 15 | 10% | AA: 90% ATBS: 10% | 2.3 | 6000 |
| Example 16 | 20% | AA: 90% ATBS: 10% | 3.6 | 3000 |

When the conditions of the invention are used, the polymer obtained has a greatly improved thickening effect.

What is claimed is:

1. A polymer in the form of a water-in-oil inverse emulsion obtained by polymerization of an aqueous solution of one or more monomers in water-in-oil inverse emulsion, in which one or more of the monomers used comprise(s) at least one acid function, the molar percentage of monomers bearing at least one weak acid function relative to all the monomers used being at least 30%, wherein:
   i) the polymerization is carried out with a concentration of all the monomers in aqueous solution which falls within the range of from 1.3 mmol to 3.6 mmol per gram of aqueous solution, and
   ii) during the polymerization, at most 20% of the acid functions present on the monomers which have at least one acid function are in neutralized form.

2. The polymer as claimed in claim 1, wherein at most 20% of the acid functions present in the polymer are in neutralized form.

3. The polymer as claimed in claim 2, subsequently subjected to a neutralization step resulting in a percentage of neutralized acid functions relative to all the acid functions present on the polymer of from 30% to 100%.

4. The polymer as claimed in claim 1, which is branched or crosslinked.

5. The polymer as claimed in claim 1, subsequently subjected to an isolation step so as to be in the form of a powder.

6. The polymer as claimed in claim 5, wherein the isolation step is selected from the group consisting of precipitation, azeotropic distillation and spray-drying techniques.

7. The polymer as claimed in claim 1, which is water-soluble or water-swelling.

8. The polymer as claimed in claim 1, wherein at most 5% of the acid functions present in the polymer are in neutralized form.

9. The polymer as claimed in claim 1, wherein at most 2% of the acid functions present in the polymer are in neutralized form.

10. The polymer as claimed in claim 1, wherein, during the polymerization, at most 5% of the acid functions present on the monomers which have at least one acid function are in neutralized form.

11. The polymer as claimed in claim 2, wherein, during the polymerization, at most 2% of the acid functions present on the monomers which have at least one acid function are in neutralized form.

12. The polymer as claimed in claim 3, wherein all the acid functions present on the monomers are in free acid form during the polymerization.

13. The polymer as claimed in claim 1, wherein the polymerization is carried out with a concentration of all the monomers in aqueous solution which falls within the range of from 1.7 to 3.3 mmol per gram of aqueous solution.

14. The polymer as claimed in claim 1, wherein the molar percentage of monomers bearing one or more weak acid function(s) relative to all the monomers used which bear an acid function is at least 50%.

15. The polymer as claimed in claim 1, wherein all the monomers used are monomers which have at least one ethylenic unsaturation.

16. The polymer as claimed in claim 1, wherein the monomer bearing at least one weak acid function, in free acid form, is selected from the group consisting of acrylic acid, methacrylic acid, itaconic acid, crotonic acid, maleic acid and fumaric acid.

17. The polymer as claimed in claim 1, wherein the polymerization is carried out with at least one neutral monomer selected from the group consisting of acrylamide, methacrylamide, N,N-dimethylacrylamide, N-vinylmethylacetamide, N-vinylformamide, vinyl acetate, diacetone acrylamide, N-isopropylacrylamide, N-[2-hydroxy-1,1-bis(hydroxymethyl)ethyl]propenamide, (2-hydroxyethyl) acrylate, (2,3-dihydroxypropyl) acrylate, methyl methacrylate, (2-hydroxyethyl) methacrylate, (2,3-dihydroxypropyl) methacrylate and vinylpyrrolidone, in addition to the said monomers bearing at least one weak acid function.

18. The polymer as claimed in claim 1, wherein all the monomers used to carry out the polymerization which bear at least one acid function are monomers bearing one or more weak acid function(s).

19. The polymer as claimed in claim 17, wherein the polymerization is carried out with a mixture of acrylic acid/acrylamide monomers, with a degree of neutralization of the acid functions, wherein at most 20% of the acid functions present on the monomers, which have at least one acid function are in neutralized form, or wherein all of the acid functions present on the monomers are in free acid form during polymerization, wherein the acrylic acid monomer is the monomer bearing the weak acid function and the acrylamide monomer is the neutral monomer.

20. The polymer as claimed in claim 1, wherein the polymerization is carried out with at least one monomer bearing one or more strong acid function(s) in addition to at least one monomer bearing at least one weak acid function.

21. The polymer as claimed in claim 20, wherein the polymerization is carried out with a molar percentage of monomers bearing one or more strong acid function(s) relative to all the monomers used of less than 50%.

22. The polymer as claimed in claim 20, wherein the monomer bearing one or more strong acid function(s), in free acid form, is an acrylamidoalkylsulfonic acid.

23. The polymer as claimed in claim 20, wherein the polymerization is carried out with a mixture of 2-acrylamido-2-methylpropanesulfonic acid/acrylic acid monomers or a mixture of 2-acrylamido-2-methylpropanesulfonic acid/acrylic acid/acrylamide monomers, with a degree of neutralization of the acid functions, wherein the 2-acrylamido-2 methylpropanesulfonic acid monomer is the monomer bearing a strong acid function, the acrylic acid monomer is the monomer bearing the weak acid function, and the acrylamide monomer is the neutral monomer.

* * * * *